United States Patent [19]
Gauthier et al.

[11] Patent Number: 4,971,494
[45] Date of Patent: Nov. 20, 1990

[54] BOLT FOR AN ANCHORING HOLE WITH AN UNDERCUT

[75] Inventors: Alain Gauthier, Tournon; Jean-Paul Barthomeue, Bourg de Peage; André de Neergaard, Tournon, all of, France

[73] Assignee: Societe de Prospection et d'Inventions Techniques (S.P.I.T.), Bourge-les-Valence Cedex, France

[21] Appl. No.: 429,448

[22] Filed: Oct. 31, 1989

[30] Foreign Application Priority Data

Nov. 4, 1988 [FR] France .................. 88 14405

[51] Int. Cl.$^5$ ............................................. F16B 13/06
[52] U.S. Cl. ........................................ 411/55; 411/61; 411/70
[58] Field of Search ................ 411/55, 60, 61, 43, 411/69, 70

[56] References Cited

U.S. PATENT DOCUMENTS

| | | | |
|---|---|---|---|
| 4,002,100 | 1/1977 | Buchell | 411/61 |
| 4,634,326 | 1/1987 | Fischer | 411/61 X |
| 4,673,321 | 6/1987 | Herb et al. | 411/61 |

FOREIGN PATENT DOCUMENTS

| | | | |
|---|---|---|---|
| 067941 | 4/1982 | European Pat. Off. . | |
| 156115 | 1/1985 | European Pat. Off. . | |
| 2815998 | 10/1979 | Fed. Rep. of Germany | 411/55 |
| 1210933 | 11/1970 | United Kingdom | 411/55 |

Primary Examiner—Neill R. Wilson
Attorney, Agent, or Firm—Schwartz & Weinrieb

[57] ABSTRACT

The bolt assembly comprises a traction shaft 1 with an anchoring extremity 13, an expansion ring 2 formed by means of expansible leg elements 18,19, and a brace 3 disposed around the shaft 1 and supported against a shoulder 24 provided upon the expansion elements 18, 19 in order to provoke expansion of leg portions 22, 23 with an undercut portion of an anchoring hole. The expansion elements 18, 19 extend between the shaft 1 and the brace 3 so as to give the latter a bearing surface of the same length as the legs 22, 23. The shoulder zone 24 defines an articulation region for the legs 22, 23.

The bolt assembly is used for the fixing of pieces within a zone subject to tensile forces within a building material.

20 Claims, 5 Drawing Sheets

BOLT FOR AN ANCHORING HOLE WITH AN UNDERCUT

FIELD OF THE INVENTION

The present invention concerns a bolt for an undercut anchoring hole comprising a traction shaft provided with a fixing extremity for a piece to be secured to a support member within which the anchoring hole is formed, and a conical anchoring extremity intended to be inserted at least partially inside the anchoring hole undercut, several elements each with an expansible leg forming an expansion ring and, a tubular brace disposed around the traction shaft and supported against an annular transversal shoulder provided upon the expansion ring and intended to drive the expansible legs of the ring in cooperation with the conical extremity of the traction shaft so as to force the legs to expand radially inside the undercut portion of the anchoring hole.

BACKGROUND OF THE INVENTION

Bolts of this type are used for securing pieces situated within a zone subject to tensile forces within a building material, for example the soffit of a concrete slab. These bolts are more particularly designed to remain sufficiently anchored, even if a crack forms inside their receiving slab zone.

A bolt of the type mentioned above is described within the document EP-A1-0 226 524. This bolt has two drawbacks. An articulated or flexion groove has to be machined inside the essential parts of the expansion ring in order to form the expansible leg portion beyond that groove.

The annular shoulder of the ring used to support the brace is provided near the plane of the ring extremity orientated towards the fixing extremity of the traction shaft so that, after expansion, the essential parts of the ring are spaced from the traction shaft substantially all along their mutual axial length between the plane of the annular shoulder and the cooperation plane between the expansible legs and the conical extremity of the traction shaft, thus creating an empty space detrimental to anchoring resistance.

The object of the present invention is to overcome these drawbacks.

Indeed, a bolt of a similar type to the one mentioned above is described within the document EP-A2-0 067 941. However, inside this bolt, the expansible legs are formed between the slits provided within the brace itself and, as in the case of the other bolt of the prior art already mentioned, beyond the articulation grooves machined for this purpose. As the expansible legs and the remaining portion of the brace have respective different functions, the unique type of material of the brace is not always adapted to any of the functions, uses, or requirements. Moreover, the anchoring resistance could sometimes prove unsatisfactory due to the expansion deficiency opposite the slits.

SUMMARY OF THE INVENTION

The present invention thus concerns a bolt of the abovementioned type, wherein the elements of the expansion ring upon the end thereof opposite the expansible legs extend beyond the transversal annular shoulder defined between the brace and the traction shaft so as to offer the brace a longitudinal cylindrical area of support with a length almost comparable with that of the expansible legs, the annular transversal zone forming the articulation zone for the expansible legs.

By means of the sound support of the brace upon the expansion elements, the expansion element portions of the expansion ring, which extend between the brace and the traction shaft, remain in contact against the shaft, which improves the anchoring resistance of the anchoring bolt of the invention. This resistance is also increased by virtue of no empty space existing between the adjacents elements of the expansion ring.

In a preferred embodiment of the bolt of the invention the transversal thickness of the expansible legs is equal to at least twice that of the expansion element portions comprising the maintaining legs extending above them and which are maintained between the brace and the traction shaft.

Accordingly, the expansion obtained with the bolt of the invention is excellent.

Advantageously, the expansion element portions disposed above the expansible legs are maintained between the brace and a constricted sectional portion of the traction shaft.

Also advantageously, the transversal thickness of the brace is equal to the difference between the thickness of the expansible legs and that of the expansion element disposed above the legs.

In this case, the brace can be a tube with a constant annular section or it may have a thickness beyond an annular shoulder for defining a space for receiving the expansion element portions disposed above the expansible legs.

The expansion ring can comprise at least two shell elements each formed from a blank of stamped steel metal partly folded back onto itself over at least two thicknesses in order to form an expansible and rolled leg.

But preferably, the expansion ring comprises at least two one piece shell elements, advantageously obtained from a tubular element and then slit.

In this case, the tubular element of origin has an inner diameter advantageously greater than the diameter of the traction shaft, so as to insure the fact that the element encounters expansion surface.

Preferably, the expansion elements comprise means for locking the elements onto the brace, thus ensuring the assembling of the brace, the expansion ring and the traction shaft.

In one particular embodiment of the invention, the expansible legs of the expansion ring are disposed so that, by hammering and rotating the expansion ring, it is possible to drill the undercut of the anchoring hole.

BRIEF DESCRIPTION OF THE DRAWINGS

The invention will be more readily understood upon reading the following description concerning several embodiments of the bolt of the invention with reference to the attached drawings in which like reference characters designate like or corresponding parts throughout the several views, and wherein.

DETAILED DESCRIPTION OF THE ILLUSTRATED EMBODIMENTS

Figure 1:
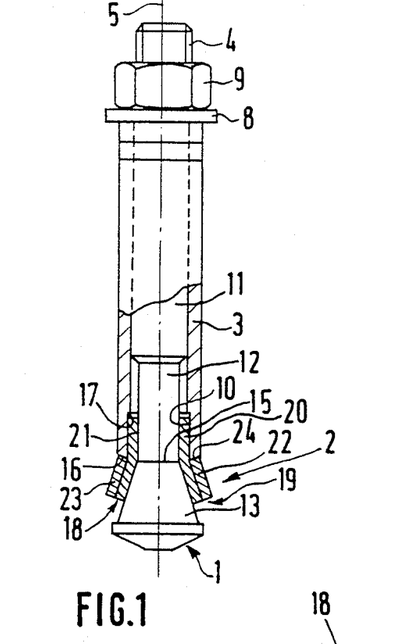
FIG. 1 is a partial axial sectional view of a first embodiment of the bolt of the invention after anchorage, along the plane I—I of FIG. 3.

The bolt assembly of FIG. 1 includes an anchor and a cylindrical traction shaft 1 having an axis 5, an expansion ring 2 and a brace 3.

Figure 6A:
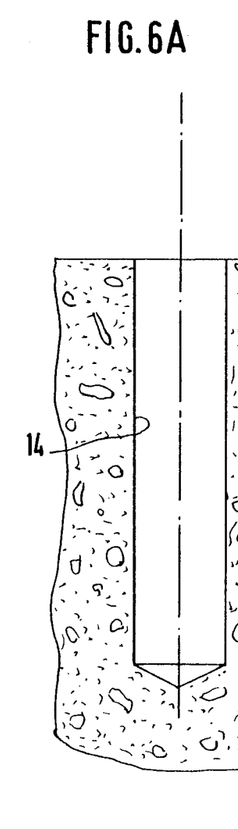
FIG. 6 is a diagrammatic view showing the anchorage of the bolt of FIGS. 1-5, namely the drilling of the hole (6A), the formation of the undercut (6B), the introduction of the bolt into the hole (6C), the anchorage of the bolt within the hole (D) and the fixing of a piece (6E)
Figure 6B:
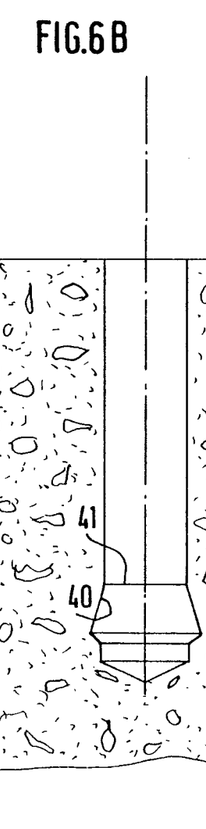
Figures 6C, 6D:
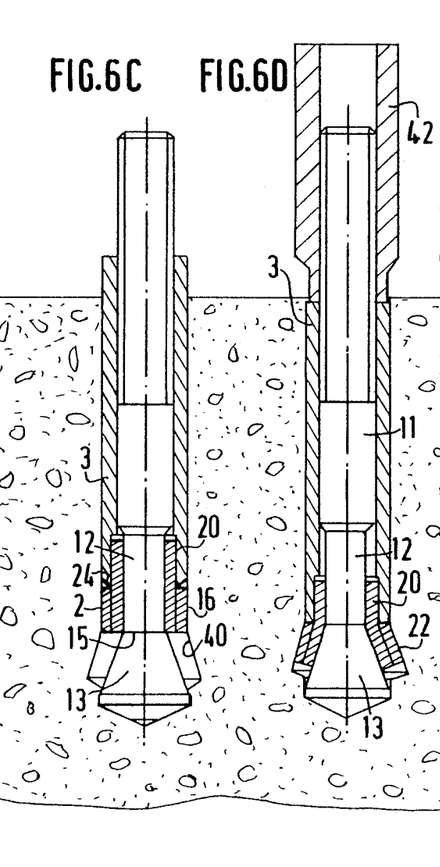
Figure 6E:
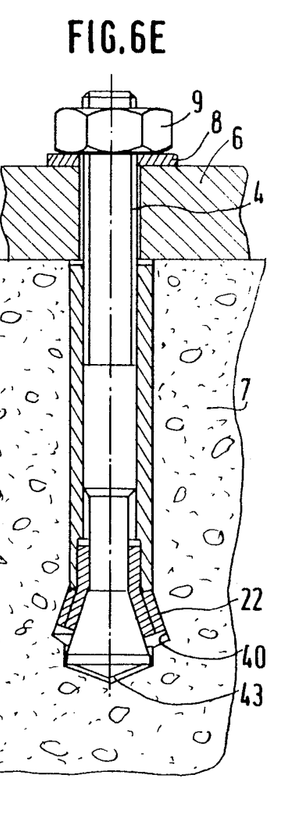

The shaft 1 is provided with a threaded extremity 4 for fixing a piece 6 to a substrate or foundation material 7 by means of a washer 8 and a nut 9 cooperating with the threads of the extremity 4 (FIG. 6E). The extremity 4 of the shaft 1 is extended downwardly by means of a shaft body 11 of the same section, which itself is extended downwardly by means of a constricted sectional shaft portion 12. The other extremity 13 of the shaft 1 which further extends the constricted portion 12 has a truncated form for expansion of the ring 2 and anchorage of the bolt, widening from the plane of the section 15 which is common to this truncated extremity and the constricted portion 12.

The brace is a tube portion whose inner diameter is approximately equal to the diameter of the shaft body 11 and whose outer diameter is approximately equal to the diameter of the anchoring hole 14 intended to receive the bolt. At a predetermined distance from its front extremity 16 for expansion-driving the ring 2, an internal ring-shaped shoulder 17 is provided upon the brace so as to define a ring-shaped groove between the brace and the constricted shaft portion 12 for receiving a holding part of the ring 2. The ring-shaped surface of the front extremity 16 of the brace 3 is truncated by means of a generating line which is substantially orthogonal to that of the truncated surface of the extremity 13 of the traction shaft and widened in the opposite direction. However, the front extremity of the brace 3 could also include adjacent to its internal edge a ring-shaped surface orthogonal to the axis 5 and connected thereto by means of a truncated chamfer.

The expansion ring 2 comprises two half shells 18 and 19 each comprising a holding leg 20, 21 received between the constricted shaft portion 12 and the brace 3 and extended downwardly by means of an expansible leg 22, 23 of approximately the same axial length, but having a thickness double that of the holding leg, thus providing an external ring-shaped shoulder 24 cooperating with the ring-shaped surface of the front extremity 16 of the brace 3. The thickness of the holding legs is approximately equal to that of the brace and the annular space defined between the brace and the constricted shaft portion 12. The brace 3, the expansion ring 2 and the shaft 1 are held assembled in the rest position by locking means which shall be described later.

The axial length of the holding legs 20, 21 of the expansion ring is slightly less than the distance from the plane of the ring-shaped shoulder 17 to the truncated extremity 16 of the brace 3. The axial length of the ring 2, namely the sum of the lengths of the holding legs and the expansible legs, is approximately equal to the length of the constricted shaft portion 12.

In the rest position (FIG. 6C), the external surface of the ring 2 is substantially circumferentially aligned with the external cylindrical surface of the brace 3, and the plane of the free extremity of the expansible legs 22, 23 is merged with the plane 15 connecting the constricted shaft portion 12 and the anchoring extremity 13 of the shaft 1. The brace 3 by means of its truncated extremity 16 is in transversal support against the external shoulder 24 of the ring 2. The brace 3 by means of its portion adjacent to its extremity 16 is in axial support against the cylindrical surface 10 of the holding legs 20, 21, the latter, in turn, being supported against the constricted shaft portion 12.

Figure 2:
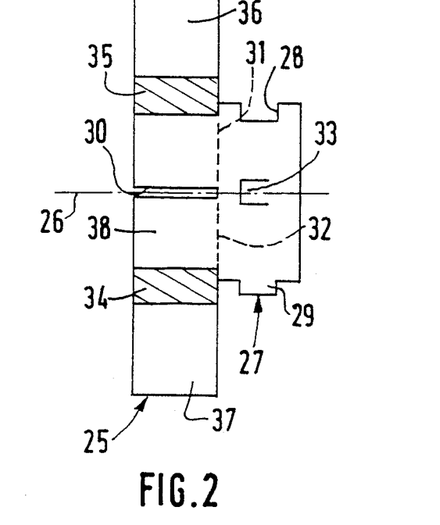
FIG. 2 is a plan view of the cut sheet steel of one of the half-shells of the expansion ring of the bolt of FIG. 1.
Figure 3:
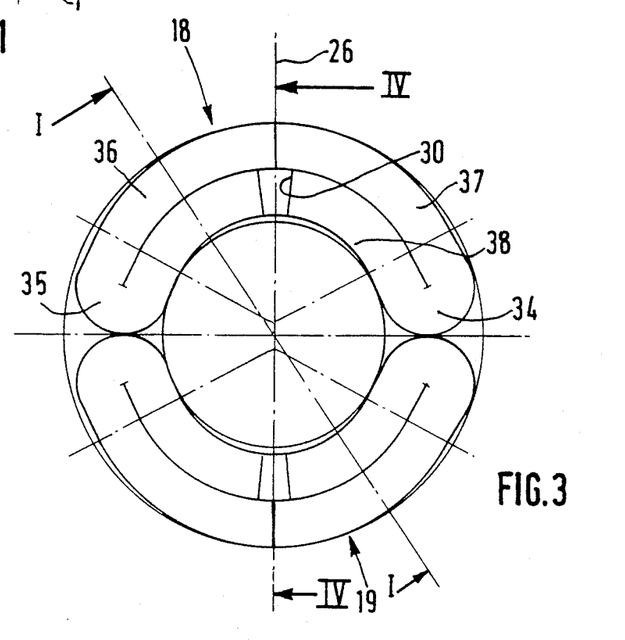
FIG. 3 is an end view of the expansion ring of the bolt of FIG. 1.

Each half shell of the expansion ring is obtained by forming the same from a sheet steel blank. FIG. 2 shows the cutting, from a rectangular sheet steel blank having a suitable thickness, length and width, of two rectangular portions from two corners with the same starting blank length in order to define a part of a T-shaped blank comprising an elongated rectangular portion 25 extending away from the median plane 26 and extended along the plane 26 by means of a smaller rectangular portion 27 of approximately the same axial length and which also extends away from the median plane 26 and whose width length is approximately one half that of portion 25. The small sides of the portion 27 disposed parallel to the plane 26 are cut so that one of them forms a notch 28 and the other forms a corresponding lug 29. A slit 30 is defined within the portion 25 along the median plane 26 so as to provide two articulation or bending zones 31, 32 extending perpendicular to the plane 26 along the side common to the two portions 25, 27. By punching the small portion 27 within the zone of the median plane 26, an assembly lug 33 is defined. The small sides of the rectangular portion 25 are folded radially inwardly toward the slit 30 around two bending zones 34, 35 which extend the two small sides of the small portion 27 in the axial direction, the wings 36, 37 of the portion 25 being folded onto the median part 38 which exaxially extends the portion 27 so as to form the expansible legs 22, 23. The unit thus obtained is then rolled around a mandrel whose section is identical to the constricted shaft portion 12 of the anchorage shaft.

Figures 4, 5:
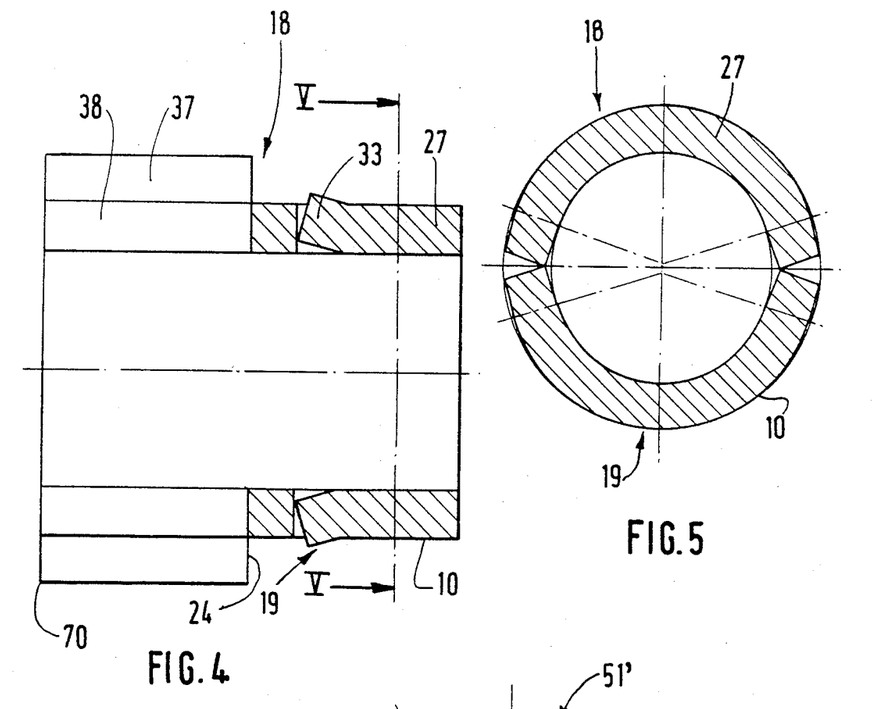
FIG. 4 is a sectional view of the expansion ring of the bolt of FIG. 1, along the plane IV—IV of FIG. 3.
FIG. 5 is a sectional view of the expansion ring along the plane V—V of FIG. 4.

In order to assemble the bolt, the two half shells 18, 19 are disposed around the constricted shaft portion 12, the lug 29 of the one half shell being engaged into the notch 28 of the other half shell so as to maintain them assembled over 360° around the shaft 1, as shown in FIG. 5. The brace 3 then slides firstly around the shaft 1 and then around the portions 27 of the half shells comprising the holding legs until the extremity 16 of the brace comes to stop against the shoulder 24 provided by means of the thickness of the folded wings 36, 37. By traversing the lugs 33, the brace 3 drives them towards the interior, but, due to their elasticity, they hook themselves onto the brace in order to maintain the assembly of the shaft 1, the ring constituted by means the two half shells, and the brace 3.

It should be mentioned that the half shells could be linked together, by dovetailing and the locking lugs should be formed, not upon the half shells, but rather upon the brace.

The foregoing description of the bolt structure is now followed by that concerning its functioning.

By means of a drill, a hole 14 is drilled into the building material 7, the hole having a depth somewhat longer than the length of the brace 3. By means of another drill, an undercut 40 is defined at a distance from the bottom of the hole 14 which is approximately equal to one half the axial length of the anchoring extremity 13 of the traction shaft 1. Wider than the hole 14, the undercut is truncated and widened towards the bottom of the hole with a generating line substantially parallel to that of the extremity portion 13 of the anchor shaft 1 intended to be received therewith. The bolt 1 is then inserted inside the hole 14 until the anchoring extremity 13 of the shaft 1 reaches the bottom of the hole. In this position, the free extremity of the expansion legs 22, 23 extend up to the connection plane 41 of the undercut 40 and the hole, and the brace 3 projects out of the hole. The brace portion projecting out of the hole is then struck by means of a tool 42 so as to provoke the expansion of the ring and anchoring of the bolt. The expansion legs 22, 23, by cooperating with the truncated extremity 13 of the shaft, are forcefully engaged between the wall of the undercut and the extremity 13 of the shaft by being bent externally around their articulation zones 31, such bending being facilitated by means of the apertures 30. Hammering continues until the truncated ring-shaped extremity 16 of the brace 3 is approximately aligned with the connection plane 41 of the undercut and the hole whereby the same is fully supported upon the shoulder 24 of the ring 2 which then extends along a conical surface having a generating line orthogonal to that of the truncated surface of the extremity 13 of the shaft 1. In this condition, the bolt is fully and properly anchored by virtue of the double thickness of the expansion legs 22,23; the anchoring resistance is also ensured by means of the mutual support of the brace 3, the holding legs 20, 21, and ring 2 and the shaft 1.

The tool 42 is then removed and it merely remains to engage upon the threaded portion 4 of the shaft 1 the path 6 to be secured to the material 7 by means of a hole made for this purpose, followed by means of the washer 8 before tightening the assembly by means of the nut 9. Any possible lateral play between the expansible legs 22 and 23 and the wall of the undercut 40 is eliminated after tightening the nut 9 upon the shaft 1 whereby the latter may move slightly upwardly inside the hole so as to eliminate any axial play 43 at the bottom of the hole, such clearance, space, or play not being prejudicial to sound anchoring resistance.

In the anchoring position and with reference to FIG. 1, it can be seen that the holding legs 20, 21 of the expansion ring do not come and stop against the internal shoulder 17 of the brace, a slight play or space being provided at this place, said clearance or space being as small as possible in order to limit as far as possible machining of the brace wall.

In the case where traction occurs upon the shaft of the bolt, the cooperation of the expansible legs and the undercut wall keeps the bolt in place. In the event of limited and permissible cracking for the remainder of the material, that is, in the case of widening of the hole 14, the bolt may move slightly upwardly within the hole, but even if the anchoring resistance diminishes, it is nevertheless annulled owing to the maintenance of cooperation, by means of the limited ring-shaped zone, of the expansion skirt of the ring 2 and the undercut wall.

Figure 7:
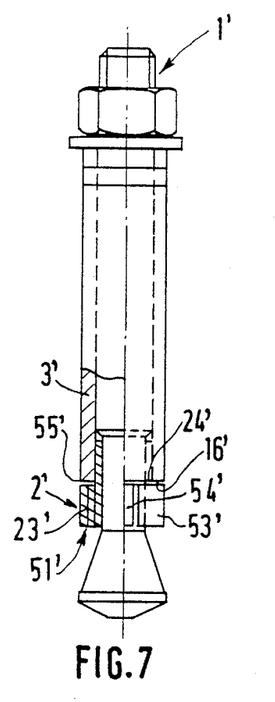
FIG. 7 is a partial axial semi-sectional view of a second embodiment of the bolt of the invention before anchoring, along the plane VII—VII of FIG. 8.
Figure 8:
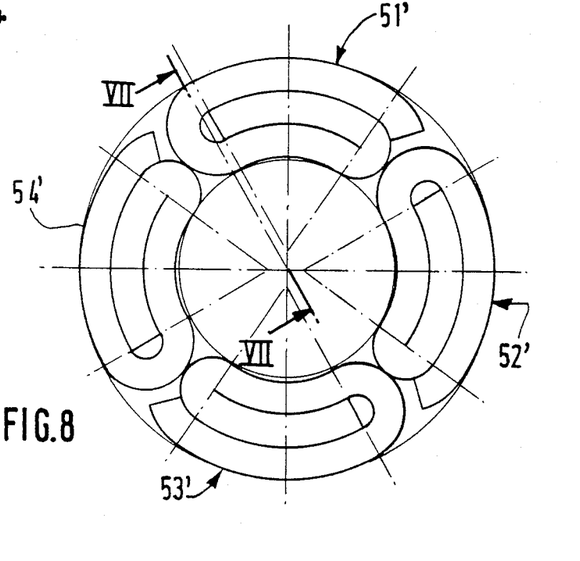
FIG. 8 is an end view of the expansion ring of the bolt of FIG. 7.

The bolt 1' of FIGS. 7 and 8 is similar in all respects to the bolt 1 of the preceding figures, except for a few aspects. The brace 3' is completely tubular and has no internal shoulder. The thickness of the starting sheet steel blank for forming the ring elements is therefore much thinner. The expansible legs 23' no longer include two but three sheet steel thicknesses after the folding onto each other of the two wings of a rectangular blank portion onto the central part of such rectangular portion. The expansion ring 2' no longer consists of two half shells but four shell quarters 51'-54'0 assembled in the same way as the half shells 18, 19 of the bolt 1.

As can be seen in FIG. 7, a circumferential groove 55' is provided in the rest position between the truncated ring-shaped extremity 16' of the brace 3' and the planar external ring-shaped shoulder 24' formed by means of the two sheet steel thicknesses folded over the extension section of the holding portion of the ring.

The assembly of the bolt 1' and its anchoring means remains identical to those of the bolt 1.

The bolt of FIGS. 9-12 is also similar to that 1 of FIGS. 1-6, except for some aspects which are described hereafter. The brace 3 is completely tubular and has no internal shoulder. The sheet steel initial thickness for also forming the two half shells 18" 19" is therefore much thinner. The expansible legs 22", 23" comprise not two but three sheet steel thicknesses.

Figure 10:
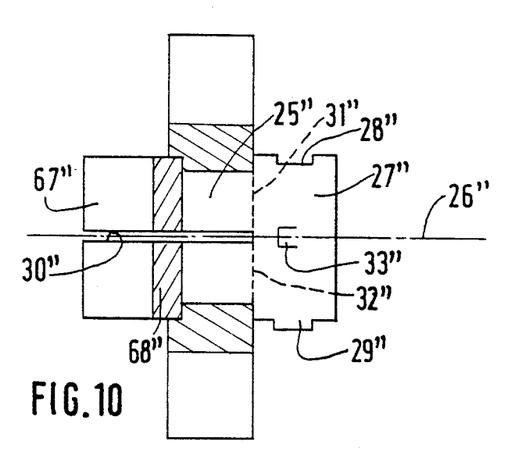
FIG. 10 is a plan view of the cut sheet steel blank of one of the half shells of the expansion ring of the bolt of FIG. 9.
Figure 11:
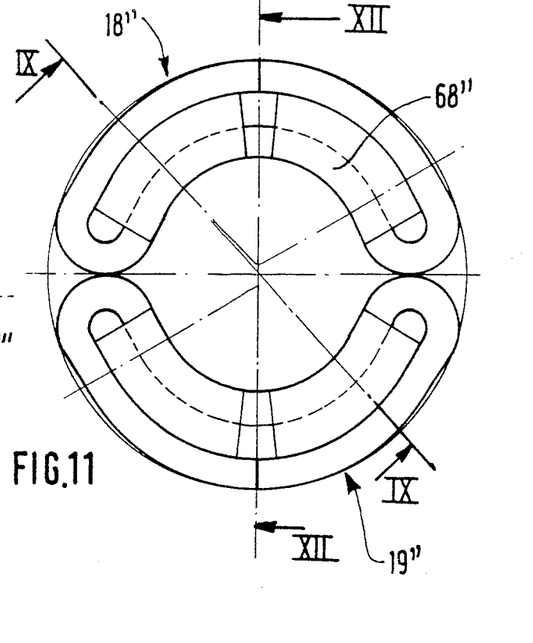
FIG. 11 is an end view of the expansion ring of the bolt of FIG. 9.
Figure 12:
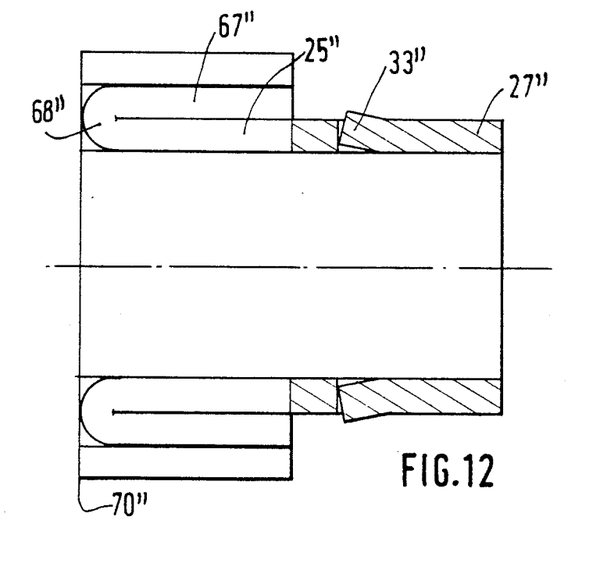
FIG. 12 is a sectional view of the expansion ring of the bolt of FIG. 9 along the plane XII—XII of FIG. 11, and, FIG. 13 is an end view of the expansion ring of a fourth embodiment of the bolt of the invention.

Each half shell 18", 19" is obtained by forming a sheet steel blank. FIG. 10 shows the cutting from a rectangular sheet steel blank with suitable thickness, length and width of four rectangular portions from the four corners so as to define a cruciform blank portion comprising a rectangular portion 25" disposed transverse to the median plane 26", the rectangular portion being extended along the plane 26 and from the two long sides thereof by means of two small rectangular portions 27", 67" of approximately the same width, which are also disposed transversely to the medium plane 26". The small sides of the portion 27" parallel to the plane 26' are cut so as to form a notch 28' in one side and a corresponding lug 29" in the other. An aperture 30" is cut within the portions 67", 25" along the median plane 26" so as to provide two articulation or bending zones 31", 32" extending perpendicular to the plane 26" along the side common to the two portions 25", 27". By punching the small portion 27" in the median plane 26", an assembly lug 33" is defined. The portion 67" is folded around a bending zone 68" extending along the side common to the portions 25" and 67" over the portion 25" before continuing to form each of the two half shells 18", 19" in a manner similar to the formation of the half shells 18, 19 of the bolt 1. The assembly of the bolt 13 and its anchoring portion remain identical to those of the bolt 1.

Two comments should be mentioned here.

Figure 9:
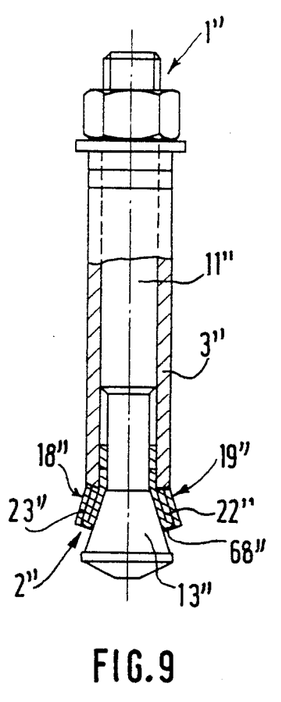
FIG. 9 shows a partial axial sectional view of a third embodiment of the bolt of the invention after anchoring, along the plane IX—IX of FIG. 11.

The bending zones 68" of the expansion brackets 2' of the bolt 1" form interior rounded edges, thus facilitating the sliding of the ring onto the conical expansion extremity 13" of the shaft 11" of the bolt 1".

The edge of the sheet steel blank portion 25" extending over the articulation zone 68" of the ring 2" of the bolt 1", like the free edge of the expansible brackets of the ring 2 of the bolt 1, has an external sharp edge, 70". This edge can have a particularly advantageous function. Subject to the original sheet steel of the expansible elements being suitably treated or where, for example, this involves a sintered metal, the undercut can be directly produced by means of this edge under the working of a hammering and rotation-driving tool. This is known as undercut auto-drilling. In this case, the expansion ring could be consequently disposed so as to receive an intermediate rotary drive device, cooperation of the drive device and the ring being able to be ensured, for example, by mounting a bracket onto one and forming a notch within the other. In this case, the anchoring phase illustrated in FIG. 6B is dispensed with. It is chiefly after auto-drilling of the undercut that a small clearance could be made, which is then eliminated by traction of the bolt, as indicated earlier.

Figure 13:
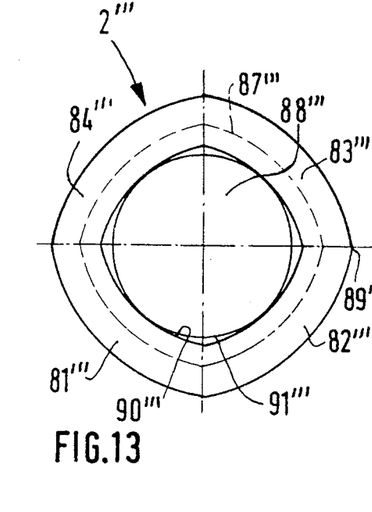

The bolt of which the expansion ring is represented in FIG. 13, distinguishes over that of FIG. 1, as far as structure is concerned, merely by means of its expansion ring 2'''. Assembling and anchoring of the bolt are identical to those of the bolt of FIG. 1. The expansion ring 2''' comprises four solid, or one piece, shell quarters 81'''-84''', assembled in a manner similar to that of the shell halves 18,19 of the bolt 1 of the shell quarters 51'-54' of bolt 1'.

There is no need to represent the bolt of this ring 2''' since its representation would be substantially identical to that of bolt 1 of FIG. 1, with the exception of the separating surface of the two thicknesses of the expansion legs of the ring not to be seen.

The shell quarters 81'''-84''' have been obtained by splitting a tubular element, having an inner shoulder 87''', corresponding to the shoulder 24 of ring 2, split here into four identical elements.

The inner diameter of this starting tubular element is greater than the diameter of the portion of the traction shaft 88''' receiving the shell quarters and thus, its outer diameter is greater than the diameter of the anchoring hole, in order that, being disposed around the traction shaft, the shell quarters 81'''-84''' are contiguous. The advantage of this feature, according to which the radius of the inner wall 90''' of the expansion elements is greater than the radius of the surface 91''' of the traction shaft receiving them is not to miss the expansion surface which, otherwise, would have been lost in front of the spaces corresponding to the splits.

Since the inner radius of the shell quarters 81'''-84''' is greater than the radius of the traction shaft 88''', the shell quarters are in contact with the traction shaft along a line parallel to the axis but they form two orthogonally arranged cutting edges 89''' which ensure to the brace a clear passage into the anchoring hole.

As means for locking the expansion elements onto the brace, these elements 81'''-84'''' comprise here, not snug means, but asperities obtained by means of milling operations.

Obviously, many modifications and variations of the present invention are possible in light of the above teachings. It is therefore to be understood that within the scope of the appended claims, the present invention may be practiced otherwise than as specifically described herein.

We claim:

1. A bolt, for disposition within an anchoring hole defined within a support structure and having a radially outwardly undercut portion, for securing a workpiece to said support structure, comprising:

a traction shaft having a longitudinal axis, a first end portion for fixing said workpiece thereto, and a second conically configured anchoring end portion for disposition within said radially outwardly undercut portion of said anchoring hole;

expansion ring means, having an axially extending sleeve portion, and a radially outwardly projecting expansible leg portion having shoulder means and an articulation zone defined within a radial plane extending transversely to said longitudinal axis of said traction shaft, disposed about said traction shaft within the vicinity of said conically configured anchoring end of said traction shaft for radial expansion about said conically configured anchoring end of said traction shaft and into said radially outwardly undercut portion of said anchoring hole so as to fixedly secure said traction shaft and said workpiece upon said support structure; and tubular brace means annularly surrounding said traction shaft and having a first end portion thereof disposed in direct contact with said shoulder means of said expansion ring means while said sleeve portion of said expansion ring means is interposed between said first end portion of said tubular brace means and said traction shaft, and a second end portion disposed within the vicinity of said first end portion of said traction shaft for receiving a tool for applying an axially directed force to said tubular brace means so as to move said tubular brace means, and said expansion ring means, axially within said anchoring hole of said support structure such that said expansible leg portion of said expansion ring means will be expanded radially outwardly about said articulation zone and into said undercut portion of said anchoring hole as a result of operative interaction of said expansion ring means with said conically configured anchoring end portion of said traction shaft.

2. Bolt as claimed in claim 1, wherein the transversal thickness of the expansible legs is equal to at least twice that of said sleeve portion extending between the brace means and the traction shaft.

3. Bolt as claimed in claim 2, wherein the sleeve portion of the expansion ring are interposed between the tubular brace and a constricted sectional portion of the traction shaft.

4. Bolt as claimed in claim 2, wherein the transversal thickness of the tubular brace is equal to the difference between the thickness of the expansible legs and the thickness of the sleeve portion of the expansion ring.

5. Bolt as claimed in claim 4, wherein the tubular brace comprises an internal ring-shaped shoulder defining a ring-shaped space for receiving the sleeve portion of the expansion ring.

6. Bolt as claimed in claim 1, wherein the front end of the tubular brace is truncated.

7. Bolt as claimed in claim 1, wherein the expansion ring comprises shell elements each obtained from a steel sheet which is cut, partly rolled and folded.

8. Bolt as claimed in claim 7, wherein the flank of the original sheet steel of each shell element is cut out and folded to form the internal rounded edges for cooperating with the expansion conic extremity of the traction shaft.

9. Bolt as claimed in claim 7, wherein the expansible legs comprise an external sharp edge.

10. A bolt as set forth in claim 7, wherein:
each of said shell elements comprises lug and notch means for maintaining said shell elements in assembled condition about said traction shaft.

11. A bolt as set forth in claim 7, wherein:
said expansible leg portion of said expansion ring means comprises folded sections of said steel sheet.

12. A bolt as set forth in claim 7, wherein:
said expansion ring means comprises two shell elements.

13. A bolt as set forth in claim 7, wherein:
said expansion ring means comprises four shell elements.

14. A bolt as set forth in claim 1, wherein:
the axial length of said sleeve portion is approximately twice the axial length of said expansible leg portion.

15. A bolt as set forth in claim 11, wherein:
said folded expansible leg portion has a thickness twice that of said sleeve portion of said expansion ring means.

16. A bolt as set forth in claim 11, wherein:
said folded expansible leg portion has a thickness three times that of said sleeve portion of said expansion ring means.

17. Bolt as claimed in claim 1, wherein the expansion ring comprises one piece shell elements.

18. Bolt as claimed in claim 17, wherein the shell elements have been obtained by slitting a tubular element.

19. Bolt as claimed in claim 17, wherein the radius of the inner wall of the shell elements is greater than that of the surface of the traction shaft receiving them.

20. Bolt as claimed in claim 1, wherein means 33 are provided for assembling the brace, the expansion ring and the traction shaft.

* * * * *